A. M. AHERN.
SMOKE PRODUCING DEVICE FOR ROUTING WILD ANIMALS.
APPLICATION FILED OCT. 25, 1912.
1,073,384.  Patented Sept. 16, 1913.
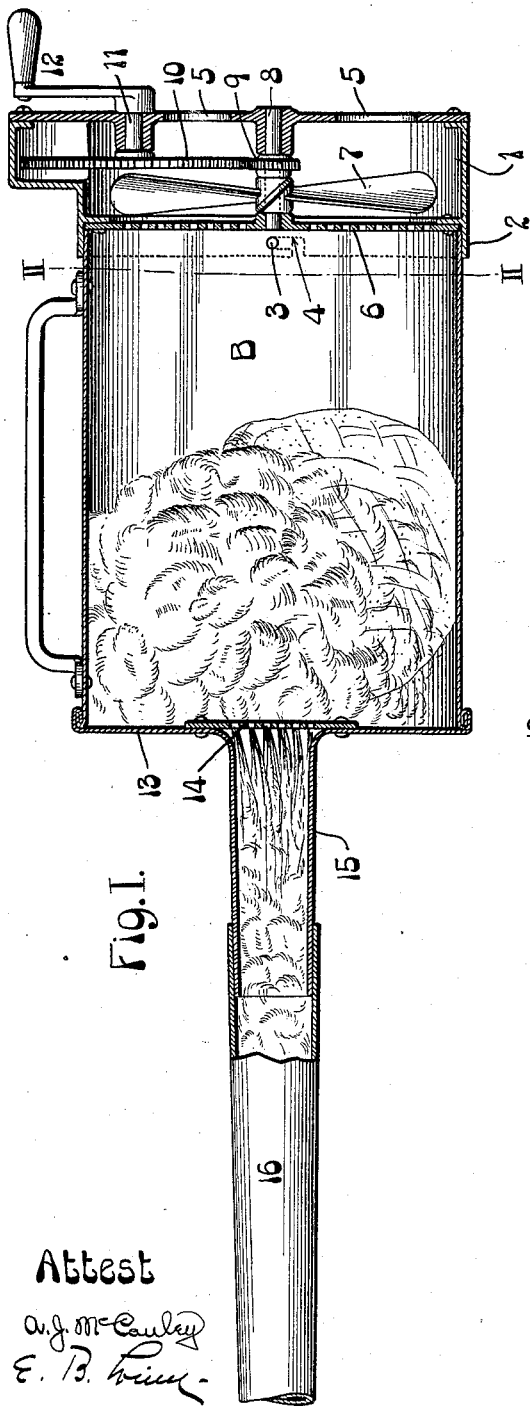
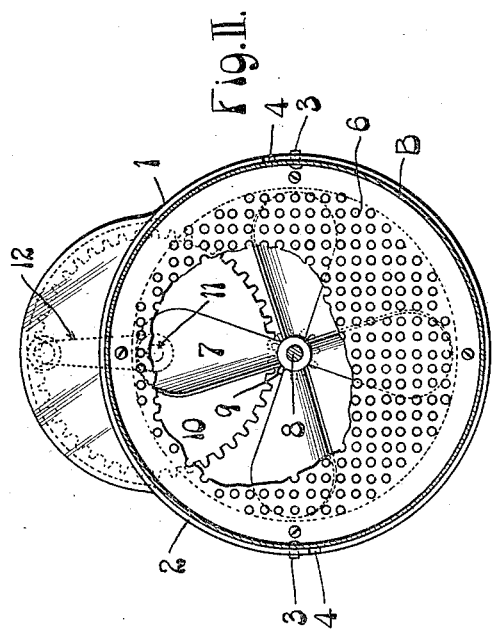
Attest
a.J. McCauley
E. B. ———
Inventor:
A. M. Ahern
by Knight & Cook
Attys.

UNITED STATES PATENT OFFICE.

ALBERT M. AHERN, OF ST. LOUIS, MISSOURI.

SMOKE-PRODUCING DEVICE FOR ROUTING WILD ANIMALS.

1,073,384.  Specification of Letters Patent.  Patented Sept. 16, 1913.

Application filed October 25, 1912. Serial No. 727,724.

*To all whom it may concern:*

Be it known that I, ALBERT M. AHERN, a citizen of the United States of America, and a resident of the city of St. Louis, in the State of Missouri, have invented certain new and useful Improvements in Smoke-Producing Devices for Routing Wild Animals, of which the following is a full, clear, and exact description, reference being had to the accompanying drawings, forming a part of this specification.

My invention relates to a device that may be utilized to produce a quantity of dense smoke and deliver it into the dens or holes of wild animals, for the purpose of driving them therefrom, in order that they may be captured; and the invention has for its object to produce a device of this kind in which a large volume of smoke may be acquired and be forcibly expelled from the device with a minimum loss of energy, or expelling force.

Figure I is a longitudinal section of my smoke producing device. Fig. II is a transverse section taken on the line II—II, Fig. I.

In the drawings: B designates a smoke chamber, that is preferably in the form of a cylinder and in which may be placed a desirable quantity of inflammable material of slow combustion, and from which a quantity of smoke may be produced during the combustion of the material. The material referred to may, for instance, be fibrous material, or the like, which will burn very slowly and is susceptible of smoldering while undergoing combustion, in order that a considerable quantity of smoke may be derived within the smoke chamber with a minimum amount of combustion. The smoke production may be accelerated and its effect amplified by the presence of sulfur, or other material, which will not only result in the production of smoke, but will also create obnoxious fumes.

One end of the smoke chamber B is closed by a fan housing 1, which constitutes a stopper for said chamber, and is preferably removably connected to the chamber body, in order that it may be separated therefrom to permit the introduction into the chamber of the material to be consumed for the production of smoke. As shown in the drawings, the fan housing 1 is formed with a flange 2, that fits around the cylindrical body of the chamber B, and said chamber is provided with studs 3 which enter into bayonet slots 4 in the flange 2, to lock the fan housing to said smoke chamber. The outer wall of the fan housing 1 is provided with air inlet openings 5, and the inner wall of said housing has a large opening. To the inner wall is secured a plate 6 which is perforated to allow air to enter the smoke chamber and is formed with a fan-shaft bearing. The perforated plate 6 serves as a guard for preventing the fuel from rolling into the fan housing.

A fan 7, arranged in the fan housing 1, is secured to a fan shaft 8 journaled in the outer wall of said housing and in the fan-shaft bearing of the perforated plate. 9 designates a pinion also secured to the fan shaft 8 and meshing with a large drive gear 10, the latter being attached to a power shaft 11 mounted in and passing through the outer wall of the fan housing and secured to the operating handle 12.

The forward end of the smoke chamber B is closed by a head 13, which is provided with a central perforated exit member 14, through which smoke may be discharged from said chamber. The head 13 carries a smoke conducting nozzle 15 that surrounds the perforated exit member 14. The nozzle 15 in turn receives an extension nozzle 16 that may be of any desirable length, suitable to convey smoke passing therethrough to considerable distance into the hole or passageway leading to the den of an animal it may be desired to "smoke out" by the use of my smoke producing device.

In the use of my device, a quantity of slowly combustible and smoke producing material is introduced into the smoke chamber B when the fan housing 1 is separated from the body of said chamber B, and said material is then ignited. The removable fan housing is next attached to the body of the smoke chamber and the fan is operated by turning the handle 12. Air is forcibly delivered into the smoke chamber by the fan to create a draft through said chamber which will cause slow combustion of the material, thereby producing a large volume of smoke which is forced from the smoke chamber through the perforated exit member 14, into and through the delivery nozzles 15 and 16 from which it passes into the den of an animal it may be desired to rout by the use of the device.

I claim:—

A smoke producing device comprising a smoke chamber, a fan housing having an outer wall formed with openings, an inner wall formed with an opening, and a flange detachably secured to the smoke chamber, a perforated plate having a fan-shaft bearing and secured to the inner wall of the fan housing over the opening thereof, a fan-shaft mounted in the fan-shaft bearing of the perforated plate and in the outer wall of the fan housing, a fan and a pinion fixed to the fan shaft, a power shaft mounted in the outer wall of the housing, a gear wheel fixed to the inner end of the power shaft and an operating handle secured to the outer end of the power shaft.

ALBERT M. AHERN.

In presence of—
A. J. McCauley,
E. B. Linn.